United States Patent [19]

Mc Fee et al.

[11] Patent Number: 5,376,803
[45] Date of Patent: Dec. 27, 1994

[54] DEVICE FOR CALIBRATING A RADIATION DETECTOR SYSTEM

[75] Inventors: Matthew C. Mc Fee, New Ellenton; Tim J. Kirkham, Beech Island; Tippi H. Johnson, Aiken, all of S.C.

[73] Assignee: The United States of America as represented by the United States Department of Energy, Washington, D.C.

[21] Appl. No.: 125,215

[22] Filed: Sep. 23, 1993

[51] Int. Cl.$^5$ .............................................. G21F 5/02
[52] U.S. Cl. ........................... 250/496.1; 250/252.1; 378/207
[58] Field of Search .................... 250/496.1, 252.1; 378/207

[56] References Cited

U.S. PATENT DOCUMENTS

| | | |
|---|---|---|
| 378,339 | 2/1888 | Smith . |
| 1,223,638 | 4/1917 | Swanson . |
| 3,310,885 | 3/1967 | Alderson ................... 35/17 |
| 3,648,389 | 3/1972 | Melzian ...................... 35/17 |
| 3,890,723 | 6/1975 | Haurat et al. ............... 35/17 |
| 4,014,109 | 3/1977 | Schramm ................. 378/207 |
| 4,527,057 | 7/1985 | Guyton et al. ......... 250/252.1 R |
| 5,227,627 | 7/1993 | Gamarnik et al. ....... 250/252.1 R |

Primary Examiner—Jack I. Berman
Attorney, Agent, or Firm—Brian R. Tumm; Harold H. Dixon; William R. Moser

[57] ABSTRACT

A device for testing a radiation detector system that includes at least two arrays of radiation detectors that are movable with respect to each other. The device includes a "shield plate" or shell, and an opposing "source plate" containing a source of ionizing radiation. Guides are attached to the outer surface of the shell for engaging the forward ends of the detectors, thereby reproducibly positioning the detectors with respect to the source and with respect to each other, thereby ensuring that a predetermined portion of the radiation emitted by the source passes through the shell and reaches the detectors. The shell is made of an hydrogenous material having approximately the same radiological attenuation characteristics as composite human tissue. The source represents a human organ such as the lungs, heart, kidneys, heart, liver, spleen, pancreas, thyroid, testes, prostate, or ovaries. The source includes a source of ionizing radiation having a long half-life and an activity that is within the range typically searched for in human subjects.

20 Claims, 2 Drawing Sheets

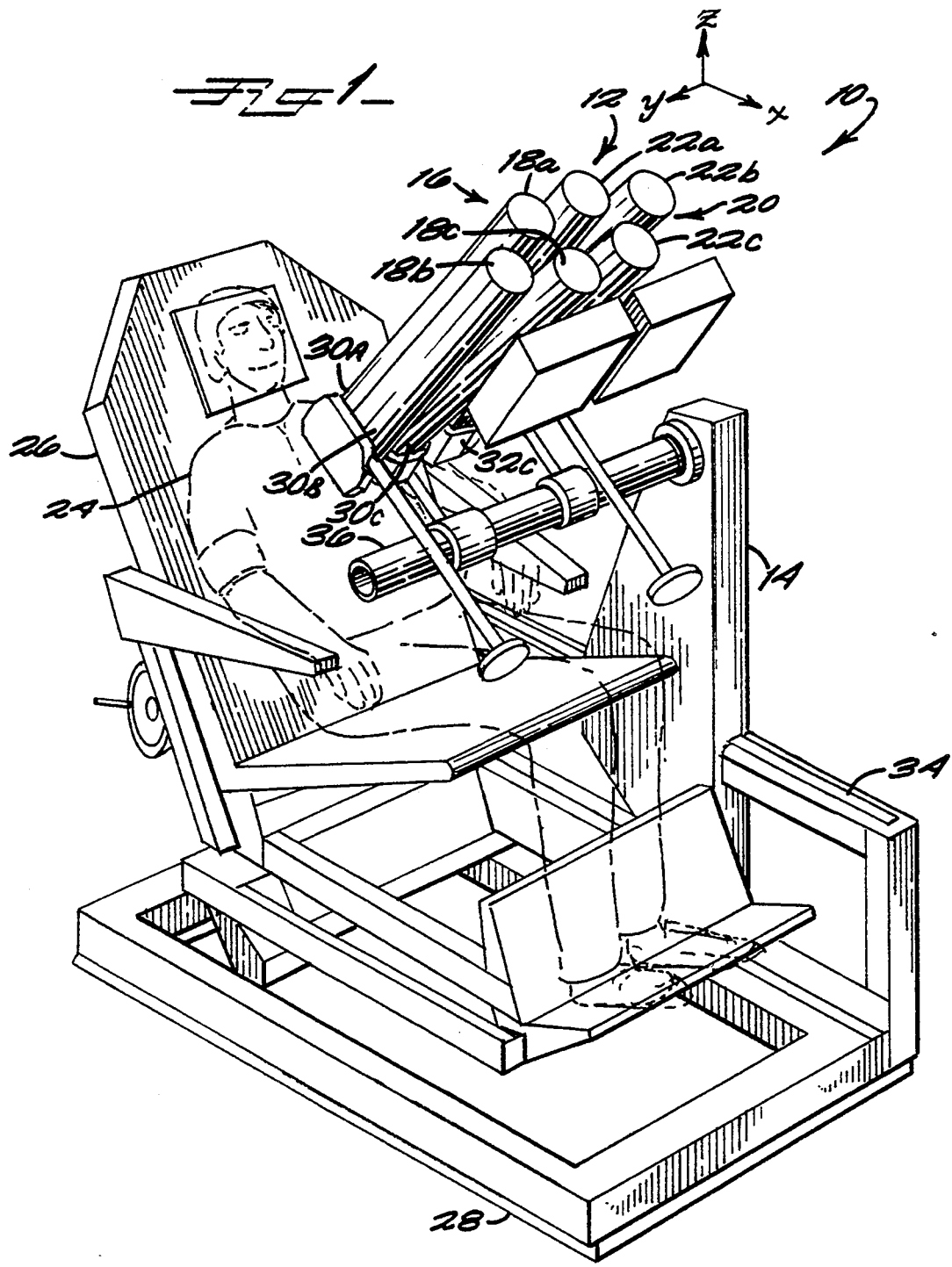

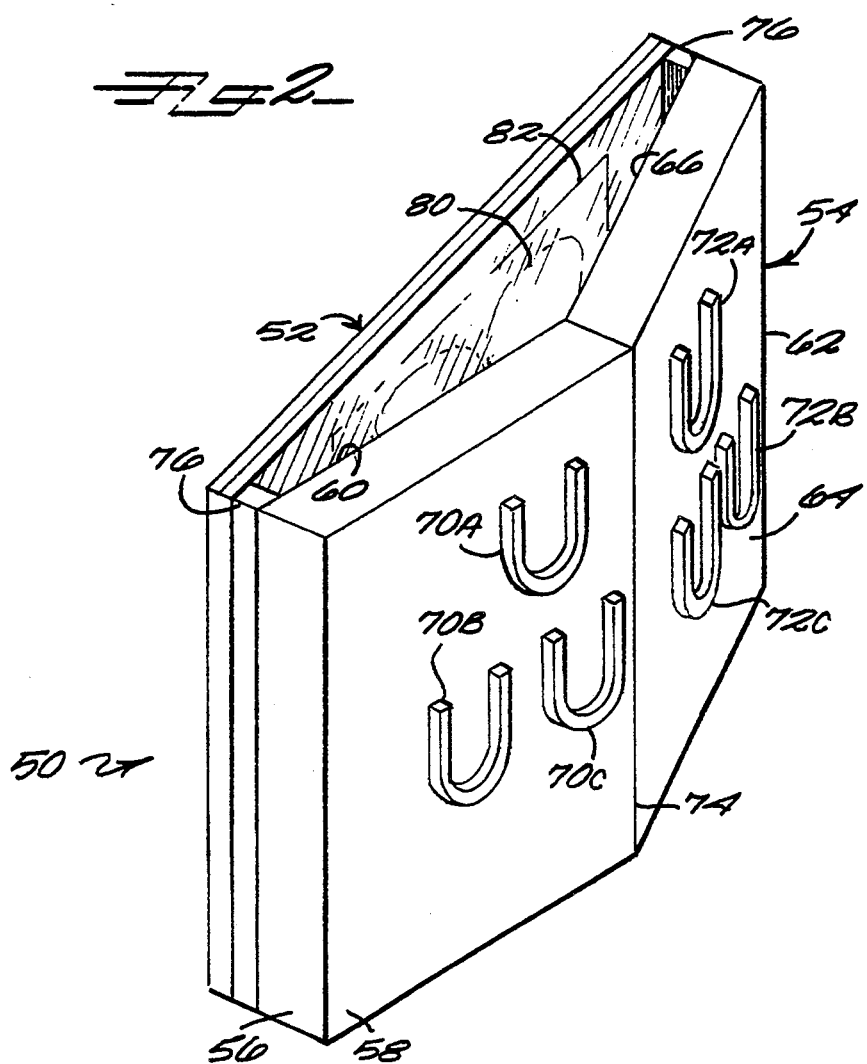
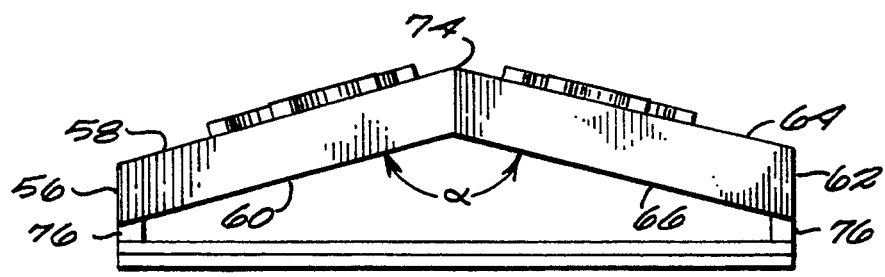

DEVICE FOR CALIBRATING A RADIATION DETECTOR SYSTEM

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention:

The present invention relates to a device for calibrating a radiation detector system that is used for measuring the radionuclide intake of those exposed to radioactive materials. In particular, the present invention relates to a device that simulates a human chest and lungs with a modicum of internal radiation for use in calibrating radiation detectors.

2. Discussion of Background:

Present-day occupational safety standards mandate that personnel exposure to ionizing radiation be as low as reasonably achievable. The recommended maximum permissible total body close for occupational exposure from all sources during any one-year period is 5 rem, independent of exposure for medical reasons or exposure to natural background radiation. Additional standards govern the maximum permissible intake of individual radionuclides. Maximum permissible intakes depend on the energy, activity and half-life of the particular radionuclide, the chemical properties of the radionuclide, the organs that accumulate the radionuclide (lungs, thyroid, kidneys, etc.), and the mode of intake (oral, by inhalation, or by a wound). The Annual Limit on Intake (ALI) by inhalation is lowest for Class Y materials (radionuclides with half-lives measured in years), and higher for Class W and Class D materials (half-lives measured in weeks and days, respectively). By way of example, the ALIs for $^{234}$Th and $^{235}$U, both Class W materials, are 190 $\mu$Ci (7.0 MBq) and 810 nCi (30,000 Bq), respectively. Data on ALIs are found in the International Commission on Radiological Protection (ICRP) Publication 30, "Limits for Intakes of Radionuclides by Workers"; these data are incorporated herein by reference.

Current regulations mandate routine exposure monitoring and regular bioassays for all personnel who may be exposed to transuranic materials. Typically, workers carry personal radiation dosimeters such as thermoluminescent dosimeters (TLDs) to record their total external exposure during a given time period, and work areas are furnished with detectors and alarms to monitor ambient radiation levels and warn of potentially-hazardous conditions. Work time in high-radiation areas is limited, sometimes to no more than a few minutes, to limit total exposure to permissible levels. Protective clothing and equipment may be required for persons working with radionuclides or in high-radiation areas.

In addition to these precautions, lung counts are carried out at intervals for all potentially-exposed personnel to monitor the uptake of radionuclides by the lungs (called the "lung burden"). In most cases, the total exposure and lung burden are very low, so an annual lung count, in conjunction with in-vitro (urine) sampling, serves primarily to verify that field monitors and personal dosimeters are working properly. Following accidental exposure to unusually high levels of radioactive materials, such as might occur during a spill or accidental release of nuclear materials, lung counts help quantify the overall internal exposure and the types and amounts of radionuclides that are present in the body.

Lung counts involve counting rates that are lower than normal background radiation levels, sometimes by a factor of ten or more depending on the location of the test site. Background counts vary widely depending on factors such as the elevation (higher background counts are found at higher elevations), the type of building (higher counts are found in concrete buildings than in wood buildings), and the amount of radon in the area. Lung counts are usually done in shielded rooms in order to reduce the contribution of spurious background radiation to the subject count. Background radiation levels can be reduced to very low levels by shielding the walls, ceiling and floor of a room with stainless steel or other highly attenuating material.

To perform a lung count, two arrays of radiation detectors are positioned close to the chest of the subject being counted, one array on each side, and the detectors are operated for a period of 30 minutes or more. The energy (keV) and activity (nCi; Bq) of any radionuclides in the subject's lungs are computed using the measured count, the radiological attenuation properties of human tissue and the response characteristics of the detectors. These data are used to evaluate the subject's overall exposure status, and the need (if any) for medical treatment and precautions regarding future occupational exposure.

Referring now to FIG. 1, there is shown a typical apparatus 10 for performing lung counts on human subjects. Apparatus 10 includes a detector system 12 as well as counters, data analysis and recording equipment, visual displays and so forth (not shown). Detector system 12 has two detector arrays attached to a support 14, a first array 16 with a plurality of detectors 18a, 18b, 18c, and a second array 20 with a plurality of detectors 22a, 22b, 22c. Detectors 18, 22 may be in the form of so-called "organ pipe" or "stove pipe" detectors such as are known in the art, approximately 4" (about 10 cm) in diameter and 27" (about 69 cm) long. A subject 24 reclines in a chair 26 for the lung count, with one detector array placed on each side of his or her chest. Chair 26 is attached to a frame 28 that allows the height and lateral position of chair 26 to be adjusted.

For optimum results, detectors 18a, 18b, 18c are placed with their forward ends 30a, 30b, 30c as close as possible to one side of the chest of subject 24 but not so close as to interfere with the subject's breathing, preferably just touching the chest. Forward ends 32a, 32b, 32c of detectors 22a, 22b, 22c are placed on the other side of the subject's chest.

To accommodate subjects with differing physiques, support 14 is slidable on a rail 34, and detector system 12 is rotatable about an arm 36 attached to support 14. The positions of individual detectors 18 of array 16, and detectors 22 of array 20, are fixed with respect to each other. However, arrays 16, 20 may be movable in tandem in a direction parallel to the longitudinal axis of detector system 12, indicated by an axis "z" in FIG. 1. Axis z is roughly parallel to the longitudinal axes of individual detectors 18, 22. Arrays 16 and 20 may also be positioned independently of each other along axis "y", perpendicular to axis z. It will be understood that the arrays 16, 20 (and detectors 18, 22) may have other degrees of freedom than those described above. For example, arrays 16, 20 may be movable with respect to each other along axis z, arrays 16, 20 may be separately rotatable about arm 36 or axis y, and individual detectors 18, 22 may be movable with respect to each other along axes "y" and "z".

To accommodate the shape of the chest, forward ends 30 of detectors 18, and forward ends 32 of detectors 22, respectively, are non-coterminal. As used herein, the term "non-coterminal" means that forward ends 30 do not terminate at the same point and do lie in the same plane, because each of ends 30 is aligned at a different angle with respect to axis z. In addition, arrays 16 and 20, when in position, each have at least one detector with a forward end that is non-coplanar with at least one detector of the other array.

Detectors 18, 22 are tested and calibrated on a regular basis to ensure the reliability of the counts. "Full calibration" is preferably done once per year. A model of the human body (dummy; mannekin; phantom) is used, preferably a model having the approximate size, shape, radiological density and effective atomic number of human tissue, with appropriately-positioned radionuclide-containing "lungs." Arrays 16, 20 are positioned on the "chest," and counts are taken with varying thicknesses of overlay material. The "lungs" may contain a single radionuclide or several radionuclides with different activities. The results are used to determine the operational parameters of the system, and to evaluate the overall variability of counts taken using apparatus 10, including the effect of different activities on the measured count and the variability of detector positioning on the human body.

Full calibration is tedious and time-consuming, requiring several days to complete. Therefore, a faster "daily calibration" or "check source" is done more frequently, usually before each day's scheduled tests. However, daily calibration may be done on a different schedule, such as on alternate days or twice per day, depending on the degree of assurance desired. Daily calibration involves placing detector arrays 16, 20 on a model, recording the output of detectors 18, 22 for a suitable time interval, and computing the energy and activity of the source from the recorded data.

For a valid comparison between daily calibration counts, the amount of radiation reaching detectors 18, 22 from a known source must be reproducible. It is well known that the recorded count at any radiation detector depends on the overall geometry, including the distance from a source of ionizing radiation, the angle of incidence of the radiation reaching the detector, the relative positions of other sources (if present), and the radiological density of intervening materials. All of these factors must be reproducible. Therefore, the same model must be used for each daily calibration, preferably a model that contains a radionuclide with a long half-life and a stable activity that is comparable to the activity measured from typical human subjects. The positions of detector arrays 16, 20 (and detectors 18, 22) must be reproducible with respect to the model and with respect to each other. Without such reproducibility, there can be no assurance that apparatus 10 is functioning within performance guidelines.

The full-size models used for full calibration are relatively accurate representations of the human body, with internal radionuclide-containing "lungs" (and other organs if desired). These devices are large, heavy and cumbersome, therefore inconvenient to use for routine testing. In addition, the devices are costly and not sufficiently durable for day-to-day use. Even if such devices were used for daily calibration, they are not adapted for precisely and reproducibly positioning detector arrays 16, 20 with respect to the "lungs" and with respect to each other. The more degrees of freedom for the movement of chair 26 and arrays 16, 20, the more difficult it is to reproduce their relative positions even approximately.

Presently-available daily calibration models include a flat "source plate" that carries a radiation source, and an overlying flat "shield plate" of PLEXIGLAS TM or some other material that mimics the radiological characteristics of tissue. Such models are useful for testing a single detector, but they are not suitable for testing a plurality of movable detectors or movable arrays. As noted above, detectors 18, 22 are designed for placement against a human chest, thus, detectors 18 (and detectors 22) are non-coterminal, and forward ends 30, 32 of detectors 18, 22 are non-coplanar. It is impossible to position detectors 18, 22 so that all forward ends 30, 32, respectively, engage a single flat surface. More importantly, because of the very low levels of activity to be measured (as low as 10 nCi), detectors 18, 22 are extremely sensitive and even small variations in the relative positions of arrays 16, 20 can lead to unacceptable variations in geometry. It is impossible to precisely and reproducibly position arrays 16, 20 so that detectors 18, 22 are in the same relative positions with respect to this type of model and with respect to each other. Therefore, it is difficult to compare daily calibration counts to determine whether apparatus 10 is operating properly. Individual sources and plates might be used for testing the individual detectors 18, 22. However, the relative positions of arrays 16, 20 must still be reproduced and the detectors tested together to determine whether or not the overall system is working properly.

Models or phantoms of the human body are frequently used in other situations. For example, phantoms are used to test automobiles and automobile accessories such as safety belts and air bags (Haurat, et al., U.S. Pat. No. 3,890,723; Melzian, U.S. Pat. No. 3,648,389). Phantoms are used in radiotherapy to simulate the human body in order to determine radiation absorption and calculate a therapeutic dose for a subject (Alderson, U.S. Pat. No. 3,310,855). The Alderson device is formed from a plastic material or FIBERGLAS TM in approximately the size and shape of the human torso, and contains several internal cavities for placing detectors to measure incident radiation. However, there is no presently-available device that contains a source that simulates radionuclide-containing organs, against which one or more arrays of detectors can be reproducibly positioned for the purpose of measuring the emitted radiation to assure the reliability of the detectors and associated equipment. A suitable device for daily use would be relatively light, simple and easy to set up and move, inexpensive, and durable.

SUMMARY OF THE INVENTION

According to its major aspects and broadly stated, the present invention is a device for calibrating a radiation detector system. The system includes at least two arrays of radiation detectors that are movable with respect to each other; each array has at least one, and preferably a plurality of radiation detectors with non-coterminal forward ends. The device includes a shield plate or shell, and an opposing source plate containing a source of ionizing radiation. Guides are formed in the outer surface of the shell for engaging the detectors, thereby reproducibly positioning the detectors and ensuring that a reproducible portion of the radiation emitted by the source passes through the shell and reaches the detectors.

In use, a count is recorded in the absence of the device and other sources of ionizing radiation (the "blank count"). Then, the detectors are positioned so that at least one detector of each array engages a guide, and all the detectors of each array substantially engage the outer surface of the shield plate or shell. The "source count" is recorded for a suitable time, and the results are used to compute the activity of the source using techniques known to those skilled in the art. If the detectors are functioning properly, the computed activity should fall within predetermined guidelines. A result that falls outside these guidelines indicates a malfunction in one or all of the detectors, or some other part of the apparatus.

Source counts taken using a device according to the present invention typically fall within approximately one standard deviation of the mean computed activity, well within operational guidelines which allow a variation within two standard deviations. The device largely eliminates personnel errors in positioning movable arrays of detectors when performing a daily calibration, and provides assurance that the detector system is operating properly.

An important feature of the present invention is the shield plate. As described above, a typical radiation detector system for use on human subjects has at least two movable detector arrays, each array containing at least one detector and preferably a plurality of detectors with non-coterminal forward ends. At least one detector of each array is non-coplanar with the detectors of the other array(s). The outer surface of the shield plate is formed so that the forward ends of all the detectors substantially engage it. The outer surface can be designed to accommodate a radiation detector system having any desired number of detector arrays and individual detectors.

The combination of the guides and the shield plate constitutes an important feature of the present invention. The guides are formed in the outer surface of the shield plate, shaped and positioned to engage the individual detectors of the arrays and thereby reproducibly position the arrays with respect to the device and to each other. For detectors having circular cross-sections, the guides may be arcuate in shape, with inner diameters approximately equal to the diameters of the detectors. Alternatively, the guides may be rings attached to the outer surface of the shield plate, circular or triangular recesses formed in the outer surface of the plate, or assume some other form for reproducibly guiding the placement of the detectors.

Another feature of the present invention is the combination of the source plate and the shield plate, which roughly approximates the human chest front and lungs. Thus, the shell is preferably made of a durable, hydrogenous material having approximately the same density as composite human tissue (bone, muscle, blood, etc.). The source plate contains a source of ionizing radiation, preferably a transuranic element with a long half-life and an activity that is within the range typically searched for in human subjects, such as between approximately 5–200 nCi (185–7,400 Bq). The source may represent the lungs, or, if desired, other organs including the heart, kidneys, heart, liver, spleen, pancreas, thyroid, testes, prostate, and ovaries.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of an apparatus for performing lung counts in use;

FIG. 2 is a perspective view of a device according to the present invention; and FIG. 3 is a side view of the device of FIG. 2.

DETAILED DESCRIPTION OF A PREFERRED EMBODIMENT

Referring now to FIG. 2, there is shown a device 50 according to a preferred embodiment of the present invention. Device 50 allows the user to precisely and reproducibly position arrays 16 and 20 of a radiation detector system such as system 12 with respect to a test source of ionizing radiation and with respect to each other. Device 50 includes a source plate 52 and an opposing, spaced-apart, shield plate or shell 54. Shell 54 includes a first side portion 56 having an outer surface 58 and an inner surface 60, and a second side portion 62 with an outer surface 64 and an inner surface 66. Source plate 52 includes a test source of ionizing radiation to be described below. A first plurality of guides 70a, 70b, 70c are attached to outer surface 58 of first portion 56; a second plurality of guides 72a, 72b, 72c are attached to outer surface 64 of second portion 62 (FIG. 2).

As best seen in FIG. 3, first side portion 56 is disposed at an oblique angle $\alpha$ with respect to second side portion 62, so that device 50 has a generally convex outer surface formed by outer surfaces 58 and 64. Angle $\alpha$ is less than 180°, preferably between approximately 140° and 170°, and most preferably approximately 150°. Thus, the midline 74 of shell 54 is further from plate 52 than the outer edges of portions 56, 62, so shell 54 roughly approximates the shape of a human chest. Spacers 76 maintain the desired separation of shell 54 and source plate 52. Alternatively, shell 54 and plate 52 may be directly attached to each other.

Guides 70, 72 are shaped and positioned to engage detectors 18, 22 of arrays 16, 20. For use with a typical lung count apparatus, the positions of guides 70, 72 are approximately symmetric about midline 74 of shell 54 to accommodate the mirror-image symmetry of arrays 16, 20. For other arrangements or arrays 16, 20 (or for use with three or more such arrays), the guides would be appropriately positioned to engage the detectors.

For detectors having circular cross-sections, such as detectors 18, 22 shown in FIG. 1, guides 70, 72 may be arcuate members with inner diameters approximately equal to the diameters of the detectors. Such guides are shown in FIG. 2. Alternatively, guides 70, 72 may be rings attached to shell 54, circular or triangular recesses formed in shell 54, or assume some other convenient form for guiding the placement of detectors 18, 22 on shell 54. Three guides 70 and three guides 72 are shown, however, the number and placement of the guides may vary depending on the number of detectors in arrays 16, 20 and the degree of free play in the positions of ends 28, 30 of detectors 18, 20. If desired, a single guide 70 may be provided on outer surface 58 for receiving one of detectors 18; similarly, a single guide 72 may be attached to outer surface 64 for receiving one of detectors 22. However, for accuracy in positioning detectors 18, 22, it is preferred to have a guide for each detector.

Device 50 is dimensioned so that the combination of source plate 52 and shell 54 roughly approximates the human chest front and lungs. Thus, shell 54 is between approximately 12″–16″ (about 30 –41 cm) wide and 11″–14″ (about 28–36 cm) long, preferably approximately 13.5″ (about 34 cm) wide and 12″ (about 30 cm) long.

The density and attenuation coefficient of shell 54 are roughly comparable to those of composite human tissue (bone, blood, muscle, skin, etc.). The attenuation coefficient of composite human tissue is approximately equal to that of water; its density (0.986 g/cm$^3$) is slightly lower than the density of water (1 g/cm$^3$). The density of air (about 0.0013 g/cm$^3$) is so low that no significant attenuation occurs in the air gap between plate 52 and shell 54 for the photons of interest. The human body consists of approximately 90% hydrogenous (i.e., hydrogen-containing) materials. Therefore, shell 54 is made of a durable, hydrogenous material that has approximately the same radiological attenuation characteristics as the human body. Suitable materials include plastics such as PLEXIGLAS™, LUCITE™, LEXAN™, TEFLON™, polyethylene, and so forth. If desired, shell 54 may consist of a rigid casing of some durable material, filled with water or some other hydrogenous liquid with a suitable density.

The optimum thickness of shell 54 depends on the choice of materials. Shell 54 should be thick enough to be durable, but thin enough that a daily calibration count can be obtained in a reasonable period of time, such as 30 minutes or thereabouts. By way of example, a shell 54 made of PLEXIGLAS ™ would be approximately 1.5″–3″ thick (about 4–8 cm), preferably about 2″ (about 5 cm) thick.

Source plate 52 has approximately the same length and width as shell 54, and is preferably about 0.5″ (about 1.3 cm) thick. Plate 52 contains a source of ionizing radiation such as a transuranic element with a long half-life. The activity of the source is preferably between approximately 5–200 nCi (185–7,400 Bq or disintegrations/sec) to model the range typically searched for in human subjects. Suitable sources include $^{235}$U (185.7 keV, 8 nCi (296 Bq)) and $^{234}$Th (63.3 keV, 150 nCi (5550 Bq)). Of course, other radionuclides with suitable energy and activity levels may be used with the invention. Suitable sources include actinides such as thorium (Th), uranium (U), plutonium (Pu), americium (Am), polonium (Po), curium (Cm) and mixtures thereof. However, any radionuclides of interest may be used, such as the radioactive isotopes of iodine ($^{126}$I, $^{129}$I, $^{131}$I, and so forth). The activity detected by this "source check" should vary by no more than approximately 20% from day to day; however, variation of no more than approximately 5% is preferred.

Source plate 52 may be prepared by drawing a lung-shaped outline 80 onto a piece of absorbent paper 82, dropping or brushing a liquid containing the chosen radionuclide onto the paper, then laminating the paper between two plastic plates after the liquid dries. Such plates are commercially available from a number of manufacturers.

The distance between the outer surface of shell 54 and source plate 52 is preferably approximately the average distance between the lungs and the outer surface of the chest. Thus, for device 50 with the dimensions listed above, spacers 76 are approximately 0–1″ (about 0–2.5 cm) long.

Device 50 is used as follows:

1. With device 50 (and other known sources of ionizing radiation) removed from the shielded room, record the count from detectors 18, 22 for a suitable time interval. This is termed a "blank," "background," or "reference" count.

2. After the blank count is completed, place device 50 on chair 26 with source plate 52 resting against the back of the chair at an angle of approximately 45° (or some other convenient angle) to the vertical. Position detectors 18, 22 so that forward end 28a of detector 18a engages guide 70a, end 28b of detector 18b engages guide 70b, and so forth. When in position, the longitudinal axes of detectors 18, 22 are tangent to shell 54, preferably approximately perpendicular to source plate 52. Forward ends 28, 30 substantially engage surfaces 58, 64, respectively.

3. Record counts from detectors 18, 22 for approximately 30 minutes (or some other suitable time interval).

4. Compute and record the activity of the source. The activity is computed by means known to those skilled in the art, using the measured count, the thickness and radiological density of shell 54, the amount and distribution of radioisotope(s) in source plate 52, and the positions of detectors 18, 22 with respect to each other, source plate 52 and shell 54. If apparatus 10 is functioning properly, the computed activity should fall within predetermined operational guidelines. A result that falls outside these guidelines indicates a malfunction in one or all of detectors 18, 22 or some other part of apparatus 10, or errors in positioning detectors 18, 22 with respect to device 50. The components of apparatus 10, including detector system 12, are then tested further to locate and repair the source of the problem.

5. If the calibration results fall within guidelines, proceed with scheduled lung counts on human subjects using the procedure described in steps 3–4.

6. For each subject, evaluate the results to determine the types and amounts of radionuclides present in the lungs. Various analyses may be carried out, depending on the nature of the occupational exposure and the types of radionuclides to which personnel may be exposed. For example, the results may be compared to the results of a previous lung count to determine whether any additional radionuclides have since been deposited in the lungs. The test data may be corrected for the background radiation in the test area by using the blank count (step 1), but normally this correction is not applied. These and other suitable analyses are carried out using techniques known to those skilled in the art.

Device 50 was tested using a lung count apparatus similar to apparatus 10 (FIG. 1), with a 234Th and 235U source having a nominal activity of 150 nCi (5550 Bq) $^{234}$Th and 15 nCi (555 Bq) $^{235}$U. Source counts were taken twice per day for 22 days, with device 50 removed from chair 26 and re-positioned for each count. The mean and standard deviation of the computed activity were 146.36 nCi (5415 Bq) and 14.65 nCi (542 Bq), respectively.

Operational guidelines allowed for a variation of no more than ± two standard deviations about the mean (here, 29.30 nCi (184 Bq), about ±20% of the mean). Each source count measured during the 22-day period was within approximately one standard deviation (about ±10%) of the mean, well within guidelines. The major contribution to the uncertainty of this measurement is the inherently random nature of radioactive decay. Additional causes of variability are residual variability in the placement of detectors 18, 22, and possibly small day-to-day variations in background activity.

A device according to the present invention can be used routinely for testing an apparatus used for lung counts. Use of the device allows for exact, reproducible geometry, that is, reproducible positioning of detectors 18, 22 with respect to a test source of radiation and with respect to each other. Because of the extremely sensitive equipment used in typical lung counts, even small errors in positioning detectors 18, 22 can lead to unacceptable variations in the source count and decreased assurance that apparatus 10 is functioning properly. Using device 50, the operator can position detectors 18, 22 so that a predetermined, reproducible portion of the radiation emitted by source plate 52 reaches the detectors, increasing the reliability of the source count. The device largely eliminates personnel errors in positioning the detectors when performing a daily calibration, and allows the operator to quickly verify that apparatus 10 is functioning within predetermined operational guidelines.

If desired, device 50 may be shaped to accommodate different arrangements of arrays 16, 20 and detectors 18, 22 than that shown in FIG. 1. Shell 54 may be formed so as to substantially engage the detectors of a plurality of movable arrays, where each array has one or more detectors.

Device 50 is made of readily-available materials, and is simple and inexpensive to manufacture. When made of PLEXIGLAS TM or a similar material, the device weighs on the order of 15 pounds (about 6.8 kg) or less, thus, it is easy to carry and position for use. If desired, device 50 may be shaped to better simulate the average human chest. For example, shell 54 may have a partial-cylindrical or partial-hemispherical outer surface, or be molded into a form that approximates the appearance of the chest. In addition, device 50 might be shaped and sized to represent other parts of the body such as the head, limbs or abdomen. Source plate 52 may contain a source of radiation shaped to represent organs other than the lungs, including the heart, kidneys, heart, liver, spleen, pancreas, thyroid, testes, prostate, and ovaries.

It will be apparent to those skilled in the art that many changes and substitutions can be made to the preferred embodiment herein described without departing from the spirit and scope of the present invention as defined by the appended claims.

What is claimed is:

1. A device for use in testing at least two arrays of radiation detectors, said arrays being movable with respect to each other, each of said arrays having a plurality of radiation detectors with non-coterminal forward ends, said device comprising:
   a shell having an inner surface and an outer surface, said outer surface formed to substantially engage said forward ends of said detectors;
   a source of ionizing radiation in spaced relation to said shell, said source opposing said inner surface of said shell; and
   means carried by said outer surface of said shell for reproducibly positioning at least one forward end of said plurality of detectors of each of said arrays so that, when said at least one forward ends engage said positioning means, said arrays are in a predetermined position with respect to each other and with respect to said source.

2. The apparatus as recited in claim 1, wherein said shell further comprises:
   a first side portion; and
   a second side portion attached to said first side portion, said second side portion disposed at an oblique angle with respect to said first side portion so that said outer surface is generally convex.

3. The apparatus as recited in claim 1, wherein said shell is made of an hydrogenous material having approximately the same radiological attenuation characteristics as composite human tissue.

4. The apparatus as recited in claim 1, wherein said positioning means further comprises means for reproducibly positioning said forward ends of said plurality of radiation detectors of each of said arrays.

5. The apparatus as recited in claim 1, wherein said source has an activity no greater than approximately 200 nCi.

6. The apparatus as recited in claim 1, wherein said source further comprises a material selected from the group consisting essentially of the actinides, the radioactive isotopes of iodine, and combinations thereof.

7. A device for use in testing a plurality of arrays of radiation detectors, said arrays being movable with respect to each other, each of said arrays having at least one radiation detector with a forward end, said detectors including at least two detectors with non-coplanar forward ends, said device comprising:
   a shell having an inner surface and an outer surface, said outer surface formed to substantially engage said forward ends of said detectors;
   a source of ionizing radiation in spaced relation to said shell, said source opposing said inner surface of said shell and spaced apart therefrom, said source emitting ionizing radiation; and
   means carried by said outer surface of said shell for reproducibly positioning said forward ends of said detectors so that, when said forward ends engage said positioning means, a predetermined portion of said emitted radiation passes through said shell and reaches said detectors.

8. The apparatus as recited in claim 7, wherein said shell further comprises:
   a first side portion; and
   a second side portion attached to said first side portion, said second side portion disposed at an oblique angle with respect to said first side portion so that said outer surface is generally convex.

9. The apparatus as recited in claim 7, wherein said shell further comprises:
   a first side portion; and
   a second side portion attached to said first side portion, said second portion disposed at an angle between approximately 140° and 170° with respect to said second portion.

10. The apparatus as recited in claim 7, wherein said shell is made of hydrogenous material.

11. The apparatus as recited in claim 7, wherein each of said arrays has a plurality of detectors, each detector having a forward end, and wherein said positioning means further comprises means for reproducibly positioning all of said forward ends.

12. The apparatus as recited in claim 7, wherein said source further comprises a material selected from the group consisting essentially of the actinides, the radioactive isotopes iodine, and combinations thereof, said source having an activity no greater than approximately 200 nCi.

13. The apparatus as recited in claim 7, wherein said source approximates a human organ chosen from the group consisting essentially of the heart, kidneys, heart, liver, spleen, pancreas, thyroid, testes, prostate, and ovaries.

14. The apparatus as recited in claim 9, wherein said source further comprises:
   a first plate;
   a second plate; and
   a third plate juxtaposed between said first and second plates, said third plate carrying said source of radiation in an outline approximating a human organ chosen from the group consisting essentially of the lungs, heart, kidneys, heart, liver, spleen, pancreas, thyroid, testes, prostate, and ovaries.

15. The apparatus as recited in claim 7, wherein each of said detectors has a circular cross-section with a diameter, and wherein said positioning means further comprises a plurality of generally arcuate members attached to said outer surface of said shell, each of said members having an inner diameter approximately equal to said diameter of said detectors.

16. The apparatus as recited in claim 7, wherein said positioning means further comprises a plurality of recesses formed in said outer surface of said shell, said recesses dimensioned to receive said forward ends of said detectors.

17. A method for making a device for testing a plurality of arrays of radiation detectors, said arrays being movable with respect to each other, each of said arrays having at least one radiation detector with a forward end, said detectors including at least two detectors with non-coplanar forward ends, said method comprising the steps of:

forming a shell having an outer surface capable of substantially engaging said forward ends;
attaching a source of ionizing radiation to said shell, said source opposing said inner surface of said shell; and
forming in said outer surface of said shell means for reproducibly positioning said forward end of said at least one detector of each array so that, when said forward ends engage said positioning means, said arrays are in a predetermined position with respect to each other and with respect to said source, whereby a predetermined portion of an ionizing radiation emitted by said source passes through said shell and reaches said detectors.

18. The method as recited in claim 17, wherein said shell-forming step further comprises joining a first plate to a second plate at an angle between approximately 140° and 170°.

19. The method as recited in claim 18, wherein said shell-forming step further comprises joining a first plate to a second plate, said plates being made of hydrogenous material.

20. The method as recited in claim 18, wherein said source-attaching step further comprises:
   encasing a source of ionizing radiation between two generally flat plates, said source having an outline approximating a human organ chosen from the group consisting essentially of the lungs, heart, kidneys, heart, liver, spleen, pancreas, thyroid, testes, prostate, and ovaries; and
   attaching said encased source to said shell so that source is in spaced relation to said inner surface of said shell.

* * * * *